United States Patent
Mateo et al.

(10) Patent No.: US 9,896,939 B2
(45) Date of Patent: Feb. 20, 2018

(54) INTEGRAL METERING FEATURE, SYSTEMS AND METHODS

(71) Applicant: United Technologies Corporation, Hartford, CT (US)

(72) Inventors: Alberto A. Mateo, Vernon, CT (US); Anthony P. Cherolis, Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 357 days.

(21) Appl. No.: 14/656,230

(22) Filed: Mar. 12, 2015

(65) Prior Publication Data

US 2016/0265360 A1    Sep. 15, 2016

(51) Int. Cl.
| | |
|---|---|
| *F01D 5/08* | (2006.01) |
| *F01D 25/12* | (2006.01) |
| *F01D 25/16* | (2006.01) |
| *F02C 7/18* | (2006.01) |

(Continued)

(52) U.S. Cl.
CPC ............... *F01D 5/08* (2013.01); *F01D 9/02* (2013.01); *F01D 25/12* (2013.01); *F01D 25/162* (2013.01); *F02C 7/18* (2013.01); *F01D 5/081* (2013.01); *F01D 5/082* (2013.01); *F01D 5/085* (2013.01); *F01D 5/087* (2013.01); *F01D 5/088* (2013.01); *F01D 25/08* (2013.01); *F05D 2220/32* (2013.01); *F05D 2260/14* (2013.01); *F05D 2260/202* (2013.01); *F05D 2260/209* (2013.01); *F05D 2260/2212* (2013.01); *F05D 2270/3062* (2013.01); *Y02T 50/676* (2013.01)

(58) Field of Classification Search
CPC . F01D 5/08; F01D 5/081; F01D 5/082; F01D 5/085; F01D 5/087; F01D 5/088; F01D 25/08; F01D 25/12; F01D 9/02; F01D 25/162; F05D 2220/32; F05D 2260/209; F05D 2260/202; F05D 2260/14; F05D 2260/2212; Y02T 50/676
USPC ........................................................ 138/44
See application file for complete search history.

(56) References Cited

U.S. PATENT DOCUMENTS

| | | | | |
|---|---|---|---|---|
| 1,096,508 | A | * | 5/1914 | Hoppes ...................... G01F 1/42 123/27 R |
| 2,632,672 | A | * | 3/1953 | Waterman ............. F22B 35/005 137/13 |

(Continued)

FOREIGN PATENT DOCUMENTS

| | | | | |
|---|---|---|---|---|
| EP | 3045672 | | 7/2016 | |
| GB | 857750 | A * | 1/1961 | ............. F01D 5/084 |

OTHER PUBLICATIONS

Extended European Search Report dated Aug. 9, 2016 in European Application No. 16159260.5.

*Primary Examiner* — Woody Lee, Jr.
*Assistant Examiner* — Behnoush Haghighian
(74) *Attorney, Agent, or Firm* — Snell & Wilmer, L.L.P.

(57) ABSTRACT

A swirler tube is disclosed. A swirler is provided comprising a flange defining a first surface, a tube extending away from the first surface, a flow surface defined by a flange inner surface and a tube inner surface, the flange inner surface having an inlet diameter, and a metering feature disposed on the flow surface, wherein the metering feature is integral to the tube, the metering feature have a metering feature diameter that is less than the inlet diameter.

14 Claims, 5 Drawing Sheets

(51) Int. Cl.
*F01D 9/02* (2006.01)
*F01D 25/08* (2006.01)

(56) References Cited

U.S. PATENT DOCUMENTS

| | | | | |
|---|---|---|---|---|
| 3,286,461 | A | * 11/1966 | Johnson | F01D 5/081 |
| | | | | 415/116 |
| 8,561,426 | B2 | * 10/2013 | Voorhis | F25B 41/06 |
| | | | | 138/44 |
| 2008/0253884 | A1 | 10/2008 | Snyder et al. | |
| 2011/0189000 | A1 | 8/2011 | Vedhagiri et al. | |
| 2013/0219919 | A1 | 8/2013 | Suciu et al. | |
| 2014/0003920 | A1 | * 1/2014 | Scott | F01D 25/12 |
| | | | | 415/177 |

* cited by examiner

INTEGRAL METERING FEATURE, SYSTEMS AND METHODS

FIELD

The present disclosure relates to metering features and more specifically to metering features in a swirler tube of a gas turbine engine.

BACKGROUND

Swirler tubes in gas turbine engines may be used to supply cooling air to a turbine portion of a gas turbine engine. Modulation of cooling air entering a swirler tube may be desirable.

SUMMARY

A swirler tube is disclosed. A swirler is provided comprising a flange defining a first surface, a tube extending away from the first surface, a flow surface defined by a flange inner surface and a tube inner surface, the flange inner surface having an inlet diameter, and a metering feature disposed on the flow surface, wherein the metering feature is integral to the tube, the metering feature have a metering feature diameter that is less than the inlet diameter.

A mid-turbine frame of a gas turbine engine is provided comprising a cooling air fluid supply, a swirler tube coupled to the cooling air fluid supply, the swirler tube comprising, a flange defining a first surface, a tube extending away from the first surface, a flow surface defined by a flange inner surface and a tube inner surface, the flange inner surface having an inlet diameter, and a metering feature disposed on the flow surface, wherein the metering feature is integral to the tube, the metering feature have a metering feature diameter that is less than the inlet diameter, wherein the tube has a curved portion.

A method of metering fluid flow in a gas turbine engine is provided comprising conducting cooling air into a mid-turbine frame of a gas turbine engine at a first diameter, metering the cooling air via a metering feature, the metering feature having a metering feature diameter that is less than the first diameter, expanding the cooling air upon exit of the metering feature.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, material, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

Swirler tubes (also referred to as swirlers) in gas turbine engines may be used to supply cooling air to a turbine portion of a gas turbine engine. Swirler tubes may include a metering feature to limit the flow rate of the cooling air through the swirler tube. Metering features may be disposed between a flange portion of the swirler tube and the mid turbine frame of a gas turbine engine. If a metering feature is manufactured as a separate component from the swirler tube, the metering feature may be incorrectly installed and cause undesirable vibration during operation.

Furthermore, it may be unpractical to manufacture metering features which are separate from the swirler tube to a desirable geometry.

Figure 1:
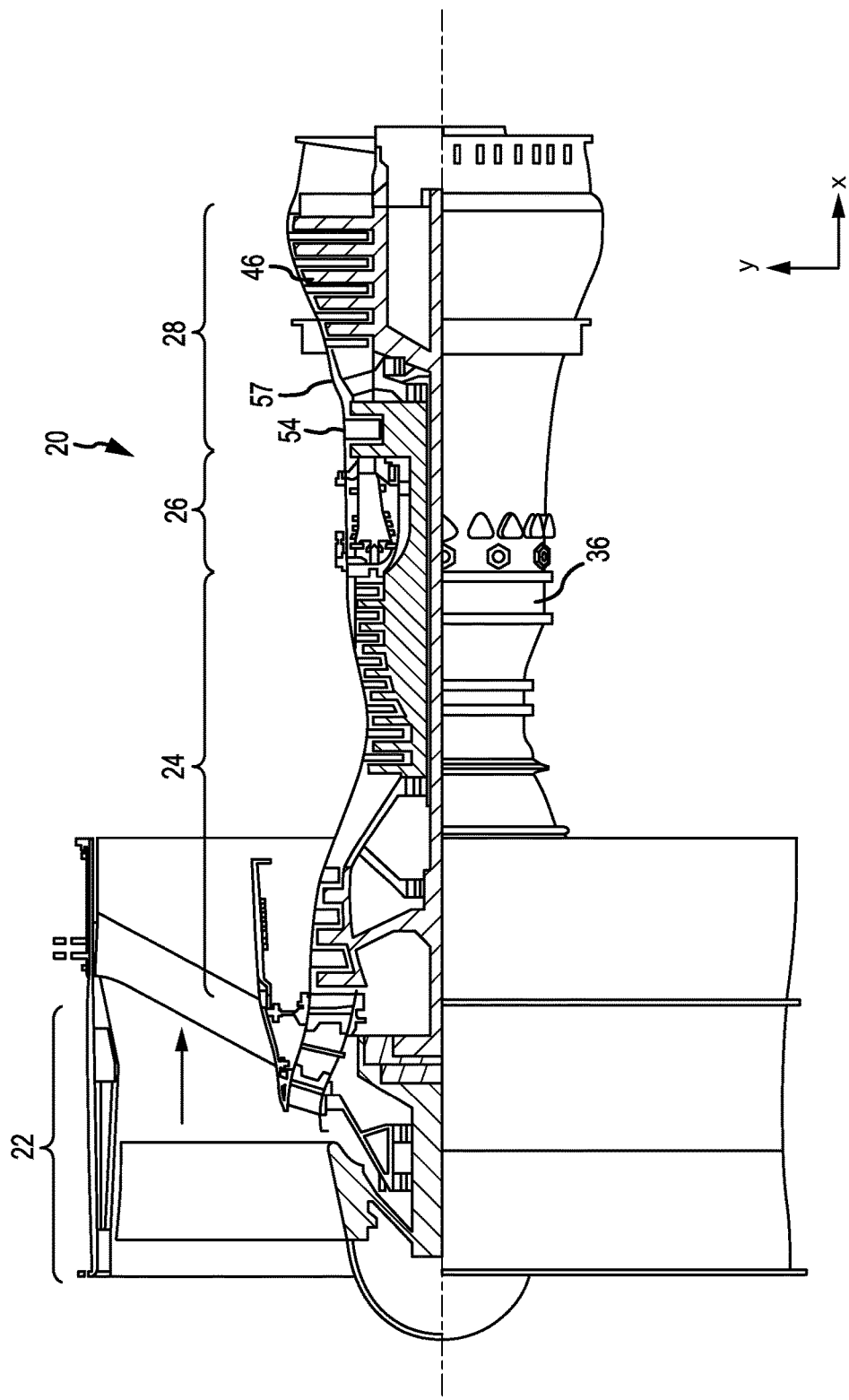
FIG. 1 illustrates an exemplary gas turbine engine, in accordance with various embodiments.

FIG. 1 is a schematic diagram of an exemplary embodiment of a gas turbine engine 20. The gas turbine engine 20 is depicted as a turbofan that incorporates a fan section 22, a compressor section 24, a combustion section 26, and a turbine section 28. A mid-turbine frame 57 of engine static structure 36 may be located generally between HPT 54 and low pressure turbine 46. It is to be understood that the concepts as disclosed herein are not limited in application to the depicted embodiment of a gas turbine engine 20, but are applicable to other types of gas turbine engines, such as those used to power modern aircraft, to power sea vessels, to generate electrical power, and in industrial applications.

Figure 2:
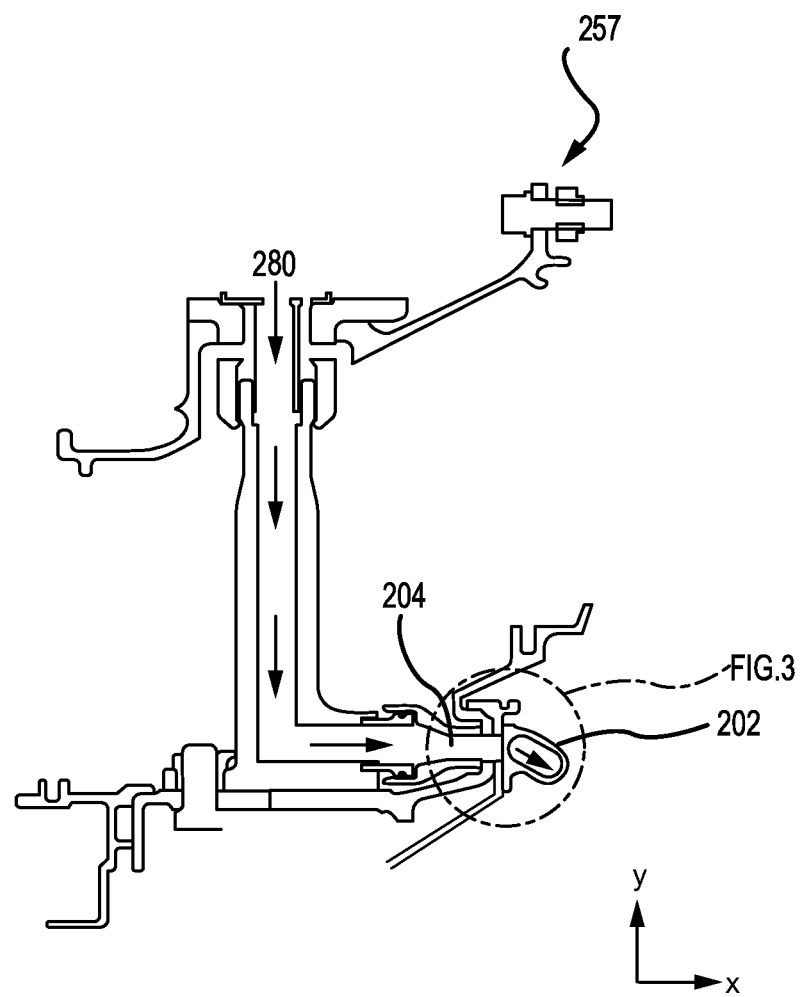
FIG. 2 illustrates a schematic view of a mid-turbine frame of a gas turbine engine, in accordance with various embodiments.

In various embodiments and with reference to FIG. 2, a mid-turbine frame assembly is illustrated with an x-y coordinate system for reference. Mid-turbine frame assembly 257 may include supply tube 204. Supply tube 204 may supply cooling air 280 to swirler tube 202. With brief reference to FIG. 1, swirler tube 202 may supply cooling air to a turbine section of gas turbine engine 20.

Figure 3:
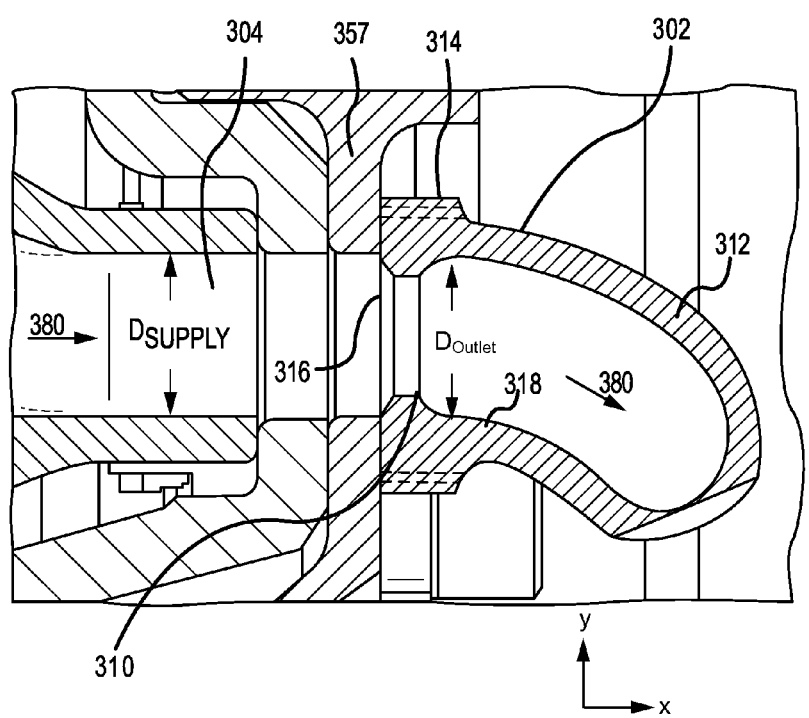
FIG. 3 illustrates an enlarged schematic view of a mid-turbine frame of a gas turbine engine, in accordance with various embodiments.

In various embodiments and with reference to FIG. 3, an enlarged schematic view of a mid-turbine frame of a gas turbine engine is illustrated with an x-y coordinate system for reference. According to various embodiments, swirler tube 302 may include flange 314, a tube 312 extending away from flange 314, and a metering feature 310. Supply tube 304 may comprise a supply tube diameter "$D_{SUPPLY}$". Flange 314 may be coupled to mid turbine frame assembly 357. Flange 314 may be located at inlet 316 of swirler tube 302. Inlet 316 of swirler tube may be that portion of swirler tube 302 where cooling air 380 enters swirler tube 302 from a fluid supply. Tube 312 may be configured to turn the flow of cooling air 380 via a bent portion of tube 312. It may be desirable to have swirler tube 302 turn the flow of cooling air 380 in order to "pre turn" cooling air 380 such that cooling air 380 exits swirler tube 302 in a direction of the rotation of a turbine rotor. According to various embodiments, the inner surface of tube 312 and flange 314 may be referred to as a flow surface 318.

Figure 4A:
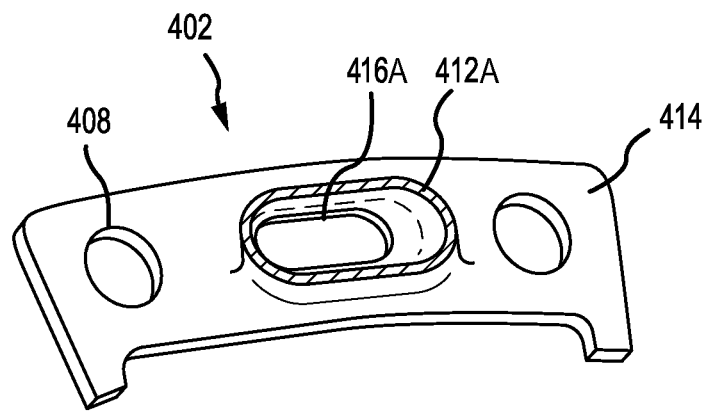
FIG. 4A illustrates an isometric view of a metered swirler tube with an elliptical inlet, in accordance with various embodiments.
Figure 4B:
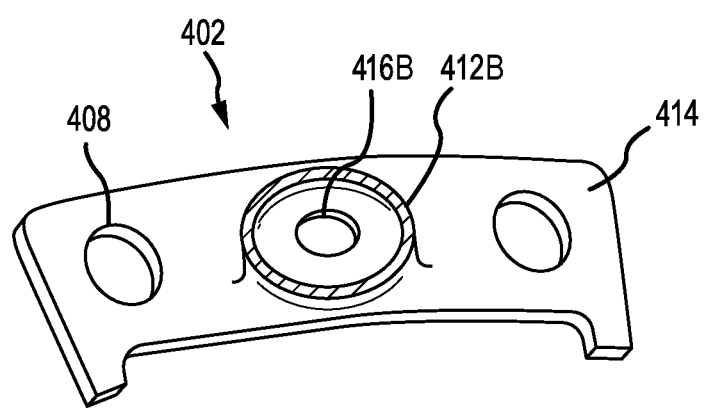
FIG. 4B illustrates an isometric view of a metered swirler tube with a circular inlet, in accordance with various embodiments.

In various embodiments and with reference to FIG. 4A and FIG. 4B, an isometric view of a metered swirler tube with an elliptical and a circular inlet respectively is illustrated. In this illustration, part of the swirler tube is removed for ease of illustration. According to various embodiments, tube 412A may comprise an elliptical shape. According to various embodiments, inlet 416A may comprise an elliptical shape. According to various embodiments, tube 412B may comprise a circular shape. According to various embodiments, inlet 416B may comprise a circular shape. The shape of tube 412A may be determined by the space available in an engine assembly for swirler tube 402.

According to various embodiments, swirler tube 402 may include fastener aperture 408 disposed on flange 414. According to various embodiments, fastener aperture 408 may be an aperture configured to allow a fastener to enter through fastener aperture 408 and attach swirler tube 402 to at least a portion of an engine, including a mid-turbine frame, for example.

According to various embodiments, swirler tube 402 may comprise a moderate to high temperature metal alloy. According to various embodiments, swirler tube 402 may comprise a nickel-based superalloy. For example, swirler tube 402 may comprise an austenitic nickel-chromium-based alloy such as Inconel®, which is available from Special Metals Corporation of New Hartford, N.Y., USA. According to various embodiments, swirler tube 402 may comprise a high temperature stainless steel.

Figure 5A:
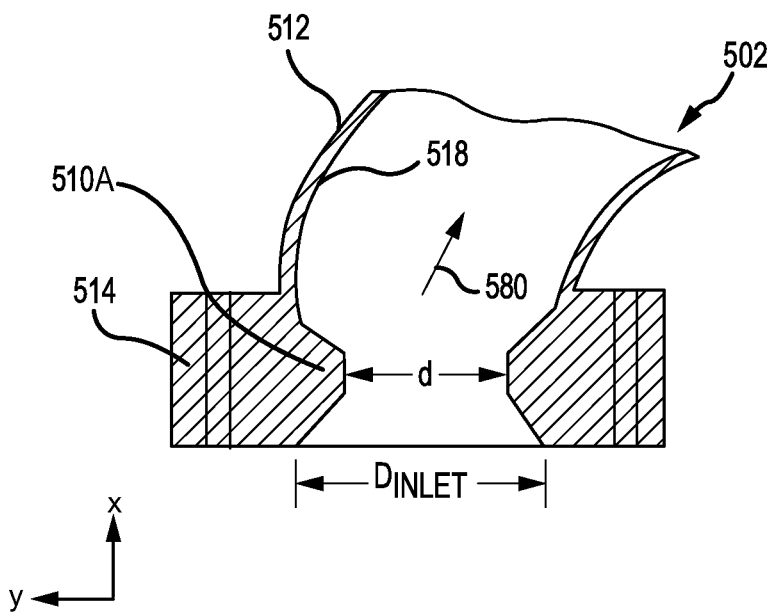
FIG. 5A illustrates a schematic view of a metered swirler tube comprising a chamfered metering feature, in accordance with various embodiments.

In various embodiments and with reference to FIG. 5A, a schematic view of a metered swirler tube comprising a chamfered metering feature is illustrated. Metering feature 510A may be integral to swirler tube 502. An integral metering feature may eliminate vibration and may decrease manufacturing costs and total part counts in engine assemblies. An integral metering feature allows for a thicker metering feature that may be manufactured to a desired geometry such as a chamfer, for example.

Metering feature 510A may comprise a metered diameter labeled as "d". It may be desirable to limit (or meter) the flow rate of cooling air 580 into a component aft (in the positive x-direction) of swirler tube 502. Accordingly, metering feature 510A may be configured to meter the flow rate of cooling air 580. Metered diameter "d" may be less than the inlet diameter "$D_{INLET}$". With further reference to FIG. 3, "d", "$D_{INLET}$", and "$D_{SUPPLY}$" may partially define cross sectional areas "A" (cross sectional area at the most narrow portion of the metering feature), "$A_{INLET}$" sectional area of the inlet of the swirler tube), and "$A_{SUPPLY}$" (cross sectional area of the inlet). For example, if the shape of flow surface 318 is circular, the cross section area "A" may be defined as the square of half of the metered diameter, labeled as "d", times π: [$A=\pi*(d/2)^2$]. Metered area "A" may be a percentage of inlet cross sectional area. For example, A may be in the range of about fifteen percent (15%) and eighty-five percent (85%) of "$A_{INLET}$," in accordance with various embodiments. For example, if the "$A_{INLET}$," is ten (10) square inches and the metered area is seventy percent (70%) of the inlet area, then the metered area would be seven (7) square inches. The inlet area "$A_{INLET}$" may be a percentage of supply area "$A_{SUPPLY}$", in the range of about fifty percent (50%) and one hundred percent (100%), in accordance with various embodiments.

With reference to FIG. 3, $D_{outlet}$ is the diameter of tube 312 aft of metering feature 310 and $A_{outlet}$ is the cross sectional area of the tube 312. In various embodiments, $A_{outlet}$>A and, accordingly, $D_{outlet}$>d.

In accordance with various embodiments, the shape of metering feature 510A may comprise a chamfer. According to various embodiments, a chamfer may be desirable in order to allow smoother air flow through swirler tube 502. According to various embodiments, a chamfer may decrease flow energy loss relative to more harsh geometric shapes such as a square, for example.

Figure 5B:
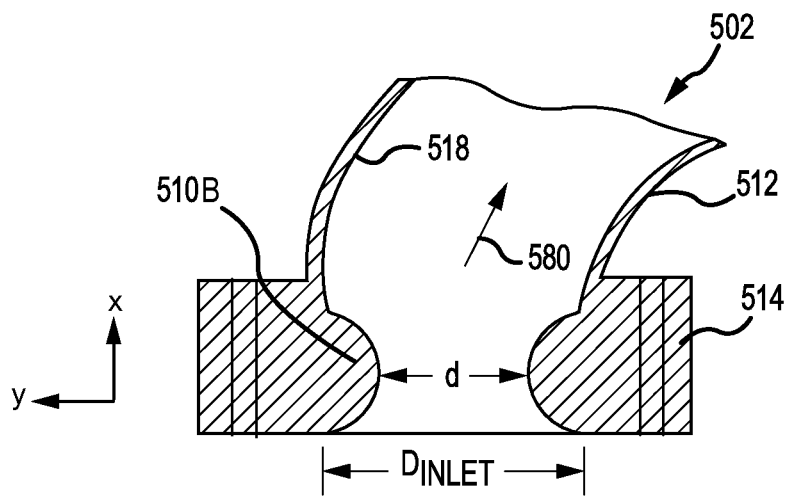
FIG. 5B illustrates a schematic view of a metered swirler tube comprising a convex fillet metering feature, in accordance with various embodiments.

In various embodiments and with reference to FIG. 5B, a schematic view of a 160 metered swirler tube comprising a convex fillet feature is illustrated. According to various embodiments, a convex fillet may be desirable in order to allow smooth air flow through swirler tube 502. According to various embodiments, a convex fillet may decrease flow energy loss relative to more harsh geometric shapes such as a square, for example.

With reference to FIG. 3, a method of metering fluid flow in a gas turbine engine is provided comprising conducting cooling air into a mid-turbine frame of a gas turbine engine at a first diameter ($D_{Supply}$). The cooling air may be metered via metering feature 310, the metering feature having a metering feature diameter (d, with brief reference to FIGS. 5A and 5B) that is less than ($D_{Supply}$), expanding the cooling air upon exit of the metering feature. For example, the cooling air may be expanded to $D_{Outlet}$.

According to various embodiments, swirler tube 502 may be manufactured via any of several manufacturing methods. According to various embodiments, swirler tube 502 may be manufactured via at least one or more of an additive manufacturing process and a subtractive manufacturing process.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A swirler comprising:
   a flange defining a first surface;
   a tube extending away from the first surface comprising a tube inlet end proximate to the first surface and a tube outlet end;
   a flow surface defined by a flange inner surface and a tube inner surface, the flange inner surface having an inlet diameter;
   a swirler tube axis extending through a center point of the flange inner surface and into the tube inlet end; and
   a metering feature disposed on the flow surface, wherein the metering feature is integral to the swirler, the metering feature having a metering feature diameter that is less than the inlet diameter,
   wherein the tube is bent along its entire length from the tube inlet end centered about the swirler tube axis to the tube outlet end extending away from the swirler tube axis.

2. The swirler of claim 1, wherein the metering feature comprises a chamfer.

3. The swirler of claim 1, wherein the metering feature comprises a convex fillet.

4. The swirler of claim 1, wherein the metering feature diameter is between 15% and 85% of the inlet diameter.

5. The swirler of claim 1, wherein the flange comprises an aperture,
   the flange being located at the inlet end.

6. The swirler of claim 5, wherein the tube is configured to be coupled to a fluid supply via the flange.

7. A mid-turbine frame of a gas turbine engine comprising:
   a cooling air fluid supply;
   a swirler tube coupled to the cooling air fluid supply, the swirler tube comprising:
      a flange defining a first surface;
      a tube extending away from the first surface comprising a tube inlet end proximate to the first surface and a tube outlet end;
      a flow surface defined by a flange inner surface and a tube inner surface, the flange inner surface having an inlet diameter;
      a swirler tube axis extending through a center point of the flange inner surface and into the tube inlet end;
      a metering feature disposed on the flow surface, wherein the metering feature is integral to the swirler tube, the metering feature having a metering feature diameter that is less than the inlet diameter,
      wherein the tube is bent along its entire length from the tube inlet end centered about the swirler tube axis to the tube outlet end extending away from the swirler tube axis.

8. The mid-turbine frame of a gas turbine engine of claim 7, wherein the metering feature is located proximate to the inlet end.

9. The mid-turbine frame of a gas turbine engine of claim 8, wherein the cooling air fluid supply is coupled to the swirler tube proximate the inlet end.

10. The mid-turbine frame of a gas turbine engine of claim 7, wherein the metering feature comprises a chamfer.

11. The mid-turbine frame of a gas turbine engine of claim 7, wherein the metering feature comprises a convex fillet.

12. The mid-turbine frame of a gas turbine engine of claim 7, wherein the metering feature diameter is between 15% and 85% of the inlet diameter.

13. The mid-turbine frame of a gas turbine engine of claim 7, wherein the flange comprises an aperture configured to couple the swirler tube to the mid-turbine frame.

14. A method of metering fluid flow in a gas turbine engine comprising:
   conducting cooling air into a mid-turbine frame of the gas turbine engine at a first diameter;
   metering the cooling air via a metering feature, the metering feature having a metering feature diameter that is less than the first diameter;
   expanding the cooling air upon exit of the metering feature;
   delivering the cooling air in a direction of the rotation of a turbine rotor by turning the cooling air in a tube coupled to a cooling air supply;
   wherein the tube comprises a tube inlet end proximate the metering feature and a tube outlet end opposite the tube inlet end, the tube inlet end being centered about a tube axis extending through a center point of the metering feature and into the tube inlet end; and
   wherein the tube is bent along its entire length from the tube inlet end to the tube outlet end extending away from the tube axis.

* * * * *